April 23, 1946. H. J. LORANT ET AL 2,398,946
ELECTRIC SOLDERING, BRAZING, AND LIKE TOOL
Filed Dec. 31, 1943

INVENTORS
Hugh J. Lorant & John W. Bridgland
By Watson, Cole, Grindle & Watson

Patented Apr. 23, 1946

2,398,946

UNITED STATES PATENT OFFICE 2,398,946

ELECTRIC SOLDERING, BRAZING, AND LIKE TOOL

Hugh Joseph Lorant and John William Bridgland, London, England; said Bridgland assignor to said Lorant Application December 31, 1943, Serial No. 516,500
In Great Britain January 4, 1943

2 Claims. (Cl. 219—26)

This invention relates to electric soldering, brazing and like tools of the contact type comprising an electrically conducting body portion that is provided with a handle member and carries an electrode for contacting with a workpiece and thereby closing the electric circuit at the electrode and heating the workpiece for soldering, brazing and like purposes.

Heretofore the electrode has been carried by a flexible member attached to the body portion at its end remote from the handle, and it is an object of the present invention to provide an improved construction of tool of the type described, in which one or more electrodes are mounted on the body portion in an improved manner, so that the tool may be better adapted than heretofore for work of various kinds.

According to the invention there is provided an electric soldering or like tool of the type described, wherein the body portion has extending through or into it one or more holes, each for detachably receiving an electrode, extending transversely of the direction of length of the body portion.

The tool may also have an end hole extending endwise into the end of the body portion remote from its handle member.

When two or more transverse holes are provided, they are preferably arranged at different angles in relation to the direction of length of the body portion.

When the body portion has at least two transverse holes, a securing means that is common to the transverse electrodes may be arranged to secure them in the holes.

Preferably, the transverse holes are in open communication one with another in the body portion, and the securing means is arranged to clamp the electrodes, or sleeves surrounding the same, together.

This securing means may be a nut or the like screwed on the body portion.

Preferably each transverse hole detachably contains a metal sleeve for receiving an electrode, and two adjacent sleeves in transverse holes may be arranged to engage one with the other within the body portion.

The tool may have a collet and a cap-screw collar or nut for securing an end electrode in the end hole in the body portion.

When a tool having a collet for securing an end electrode in position has at least one transverse hole in the body portion, the cap-screw collar or nut may be arranged to secure an electrode in each transverse hole, as well as securing the end electrode in position.

One embodiment of the invention and modifications thereof are diagrammatically illustrated by way of example in the accompanying drawing, wherein.

Like reference characters designate like parts throughout the several views.

Figure 1:
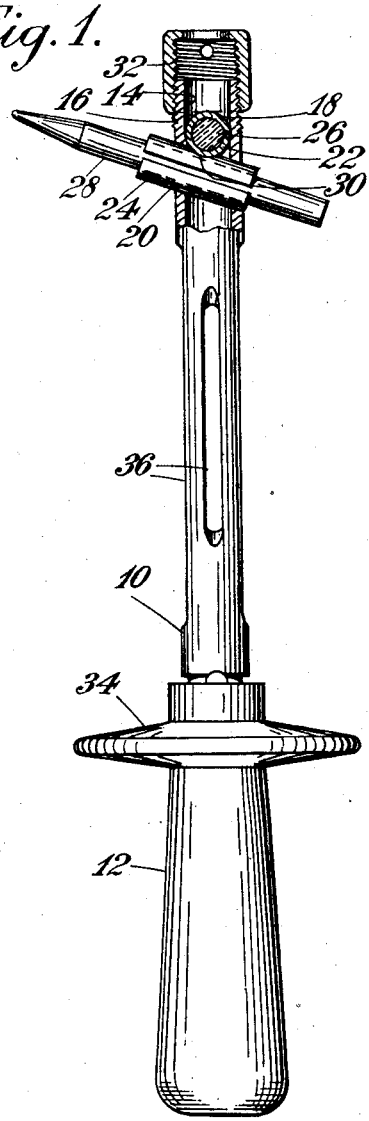
Figure 1 is a side elevation, partly in section, showing one construction of electric soldering or like tool according to the invention.
Figure 2:
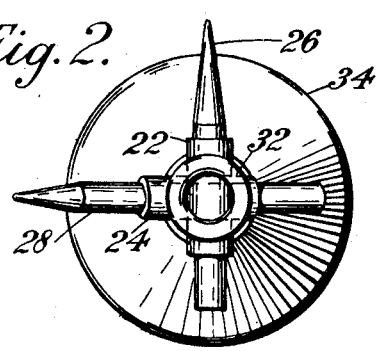
Figure 2 is an end elevation thereof.

Referring first to Figures 1 and 2, an electric soldering, brazing or welding tool of the contact type described above comprises a body portion 10 in the form of a round rod of copper, brass or other convenient non-ferrous metal that has an insulating handle member 12 screwed on one end thereof, and has a hole 14 in its opposite end which has an external screw-thread 16.

This screw-threaded end of the rod is pierced transversely with two holes 18, 20, whereof the hole 18 extends diametrically through the rod, and the second hole 20 lies transversely and obliquely in relation thereto. These holes 18, 20 open one into the other within the rod, and contain each a metal sleeve 22, 24, respectively, each of which is split longitudinally to render it resilient, and extends beyond opposite sides of the rod, and serves to detachably accommodate an electrode 26 and 28 respectively, preferably of carbon. The obliquely arranged sleeve 24 has a lateral recess 30 in its periphery at the middle of its length, into which the second sleeve 22 enters and holds it against endwise movement and removal from the rod. A securing means in the form of a cap screw 32 screwed on the end of the rod 10 serves for clamping the two sleeves 22, 24 together, and causes each electrode to be gripped in its sleeve. Even if only one sleeve has an electrode in it, the clamping force of the cap screw is transmitted serially to the pair of sleeves to hold both of them in position in the holes 18, 20 in the body portion of the tool.

The handle member 12, preferably has at its end adjacent the electrodes a shield 34 in the form of a disc. Also, the rod 10 preferably has in it one or more longitudinal slots, as shown at 36, that extend through it for cooling purposes and for enhancing the appearance of the tool.

Figure 3:
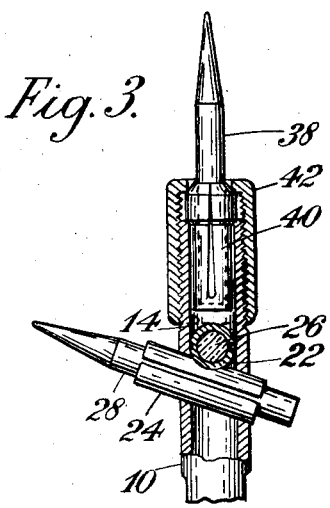
Figure 3 is a partial longitudinal section showing a modified construction of tool according to the invention.

As shown in Figure 3, an end electrode 38, when used, may be secured in position in the end hole 14 in the rod by means of a collet 40 secured in position by a cap screw 42 or nut screwed on the screw-thread 16 on the end of the rod 10. This construction enables three electrodes, which may be carbons or welding rods, to be held in position in the same tool, two being secured in position simultaneously at two different angles to the longitudinal axis of the rod. The electrodes may be of different sizes, or of the same size. Also, in some cases, they may be secured in position without sleeves.

Owing to the various positions of the electrodes in relation to the copper rod carrying them, which electrodes may be pointed or blunt, as required, the described tool is well adapted for work of various kinds, such as soldering, welding, brazing or the like.

Figure 4:
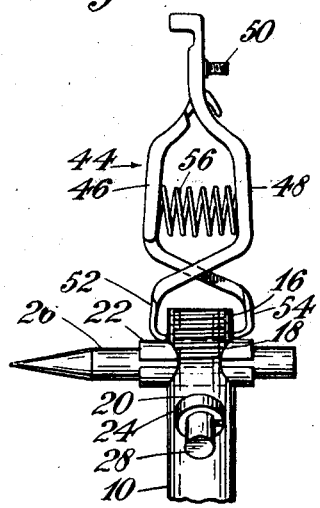
Figure 4 is a side elevation showing part of another modified construction.

The securing means on the end of the rod may be a fastener in the form of a readily detachable clip of any convenient or known construction. As shown in Figure 4, such a fastener 44 is constituted by a clip of the kind known as a crocodile clip comprising two limbs 46, 48 that are pivoted at 50 by means of a screw, and have crossed jaws 52, 54 which are pressed towards one another by a compression spring 56 arranged between the limbs 46 and 48.

Various modifications may be made in the details of construction described above without departing from the invention. For example, in some cases the transverse holes may extend not completely through, but into the body portion far enough to enable the electrodes to be held securely in position.

We claim:

1. An electric soldering, brazing or like tool of the contact type comprising an electrically conducting body portion, a handle member thereon, which body portion has two electrode-receiving holes that extend transversely of the direction of length of the body portion at different angles in relation thereto, and are in open communication one with the other within the body portion, each of which transverse holes detachably contains a longitudinally split metal sleeve for receiving an electrode, which sleeves are arranged to engage one with the other within the body portion, and a securing member that is carried by the body portion and is arranged to exert a clamping force on the sleeves, which clamping force is transmitted serially to the pair of sleeves in the absence of electrodes in one or both of the holes.

2. An electric soldering, brazing or like tool of the contact type comprising an electrically conducting body portion, a handle member thereon, which body portion has a plurality of holes extending through it transversely of the direction of length of the body portion at different angles in relation thereto, which transverse holes are in open communication one with another in the body portion, each of which holes contains a longitudinally split sleeve for containing an electrode, and a securing means that is carried by the body portion and is arranged to clamp the sleeves together in the body portion, one of which sleeves has within the body portion a lateral peripheral recess into which the second sleeve enters.

HUGH JOSEPH LORANT.
JOHN WILLIAM BRIDGLAND.